United States Patent
Chen et al.

(10) Patent No.: US 9,304,552 B2
(45) Date of Patent: Apr. 5, 2016

(54) PROTECTION DEVICE CAPABLE OF ROTATABLY SUPPORTING A PORTABLE ELECTRONIC DEVICE

(71) Applicant: Wistron Corporation, New Taipei (TW)

(72) Inventors: Fei-Ta Chen, New Taipei (TW);
Hsiang-Ho Lo, New Taipei (TW);
Shih-Jung Chuang, New Taipei (TW);
Chih-Ta Chen, New Taipei (TW);
Yao-Wei Wang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 14/551,086

(22) Filed: Nov. 24, 2014

(65) Prior Publication Data
US 2016/0011630 A1    Jan. 14, 2016

(30) Foreign Application Priority Data
Jul. 10, 2014   (TW) .............................. 103212298 U

(51) Int. Cl.
*H05K 5/00* (2006.01)
*H05K 7/00* (2006.01)
*G06F 1/16* (2006.01)

(52) U.S. Cl.
CPC .................... *G06F 1/1675* (2013.01)

(58) Field of Classification Search
CPC ........................................................... F16M 11/06
USPC ......................................... 361/679.21–679.3
See application file for complete search history.

(56) References Cited

U.S. PATENT DOCUMENTS

| 2005/0168925 A1* | 8/2005 | Fang ...................... G06F 1/1632 361/679.07 |
| 2010/0001163 A1* | 1/2010 | Takizawa ............... F16M 11/06 248/371 |

FOREIGN PATENT DOCUMENTS

| TW | 201023458 | 6/2010 |
| TW | M406962 | 7/2011 |
| TW | M426316 | 4/2012 |
| TW | I396319 | 5/2013 |
| TW | M458859 | 8/2013 |

* cited by examiner

*Primary Examiner* — Jerry Wu
(74) *Attorney, Agent, or Firm* — Winston Hsu; Scott Margo

(57) ABSTRACT

A protection device includes a cladding cover and a folding cover. A portable electronic device is detachably disposed on the cladding cover. The cladding cover includes a first connector and a first combining portion. The first connector includes a first joint and a second joint. The first joint contacts a first terminal set of the portable electronic device since the portable electronic device is disposed on the cladding cover. The folding cover includes a second terminal set and a second combining portion. The second terminal set contacts the second joint since the cladding cover is assembled with the folding cover. The first/second combining portions are respectively disposed around the first/second terminal sets. The second combining portion is rotatably combined with the first combining portion so that the cladding cover is switched relative to the folding cover between a first position and a second position.

17 Claims, 10 Drawing Sheets

PROTECTION DEVICE CAPABLE OF ROTATABLY SUPPORTING A PORTABLE ELECTRONIC DEVICE

BACKGROUND OF THE INVENTION

1. Field of the Invention

The present invention relates to a protection device suitable for the portable electronic device, and more particularly, to a protection device capable of rotatably supporting the portable electronic device and being electrically connected to the portable electronic device via a physical component instead of wireless communication.

2. Description of the Prior Art

With the advanced technology, the tablet computer is widespread applied to entertainment, education and other domains because of small-size design and convenient portable property. The tablet computer utilizes the touch panel to be a predetermined input interface for volume decrease and preferred portable convenience. Touch input of the tablet computer may be retarded and a displaying screen of the tablet computer is wasted by the virtual keyboard since the tablet computer is applied to the education purpose, so that the external physical keyboard is utilized to be the auxiliary input interface. The screen panel of the tablet computer is exposed when the tablet computer is not in use, and the protection cover is usually collocated with the tablet computer to prevent the screen panel or the housing from damage by scrape or accidental fall. The tablet computer further can stand over the supporting plane (such as the table) by the protection cover to keep a specific view angle. The auxiliary devices (which can be an external keyboard, an external power supply and so on) applied to the tablet computer may result in inconvenience even though functions of the tablet computer can be expanded as the notebook computer. Therefore, integration of the foresaid auxiliary devices for convenient operation of the tablet computer is an important issue of the related industry.

The protection cover integrated with the physical keyboard exists in the present market. The conventional protection cover includes a top body and a low body connected with each other, the physical keyboard can be installed on the low body and the tablet computer can be detachably fixed on the top body. Further, a rigid sheath can be disposed on the top body and the tablet computer is able to detachably fix inside the rigid sheath. The rigid sheath may be rotatably disposed on the top body to switch operation modes of the tablet computer. However, the tablet computer disposed on the top body is communicated with the keyboard disposed on the low body by wireless communication (such as Bluetooth), the wireless communication may be easily interfered when plenty of tablet computers are used in a crowded environment, including the classroom or the conference room, and how to prevent the wireless communication from interference without sacrificing operational convenience is an unsolved difficulty.

SUMMARY OF THE INVENTION

The present invention provides a protection device capable of rotatably supporting the portable electronic device and being electrically connected to the portable electronic device via a physical component instead of wireless communication for solving above drawbacks.

According to the claimed invention, a protection device is capable of rotatably supporting a portable electronic device. The portable electronic device has a first terminal set. The protection device includes a cladding cover and a folding cover. The portable electronic device is detachably disposed on the cladding cover. The cladding cover includes a first combining portion and a first connector. The first connector is disposed inside the first combining portion. The first connector includes a first joint and a second joint opposite to each other. The first joint is adapted to contact the first terminal set when the cladding cover supports the portable electronic device. The folding cover includes a first body, a second body, a second combining portion, a second terminal set and a second connector. The second body is foldably connected to the first body. The second combining portion is disposed on the first body. The second combining portion is adapted to rotatably combine with the first combining portion, so that the cladding cover is at least switched between a first position and a second position relative to the folding cover. The second terminal set is disposed inside the second combining portion and adapted to contact the second joint when the folding cover is assembled with the cladding cover. The second connector is disposed on the second body and electrically connected to the second terminal set.

According to the claimed invention, the second terminal set includes at least one terminal, and the at least one terminal includes a first point, a second point and a connecting section. Two ends of the connecting section are respectively connected to the first point and the second point. The second joint contacts the first point since the cladding cover is switched to the first position, and further contacts the second point since the cladding cover is switched to the second position.

According to the claimed invention, a protection device is capable of rotatably supporting a portable electronic device. The portable electronic device has a first terminal set. The protection device includes a cladding cover and a folding cover. The portable electronic device is detachably disposed on the cladding cover. The cladding cover includes a first combining portion, a first connector and a third connector. The first connector is disposed inside the first combining portion, the first connector comprising a second joint. The third connector is electrically connected to the first connector and adapted to contact the first terminal set when the cladding cover supports the portable electronic device. The folding cover includes a first body, a second body, a second combining portion, a second terminal set and a second connector. The second body is foldably connected to the first body. The second combining portion is disposed on the first body. The second combining portion is adapted to rotatably combine with the first combining portion, so that the cladding cover is at least switched between a first position and a second position relative to the folding cover. The second terminal set is disposed inside the second combining portion and adapted to contact the second joint when the folding cover is assembled with the cladding cover. The second connector is disposed on the second body and electrically connected to the second terminal set.

The cladding cover can arbitrarily rotate relative to the folding cover at the clockwise direction or the counterclockwise direction. Generally, the cladding cover whereon the portable electronic device is disposed can rotate relative to the folding cover to switch between the first position (0 degree) and the second position (90 degrees). As amounts of the second terminal and the connecting sections are increased, the portable electronic device further can rotate relative to the folding cover to be switchably located at positions in addition to the first position and the second position. Comparing to the prior art, the present invention provides new design for rotatable combination between the cladding cover and the folding cover, the portable electronic device can stably stand over the folding cover at any display angle and the signal transmission channel between the portable electronic device and the external auxiliary device is effectively maintained.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
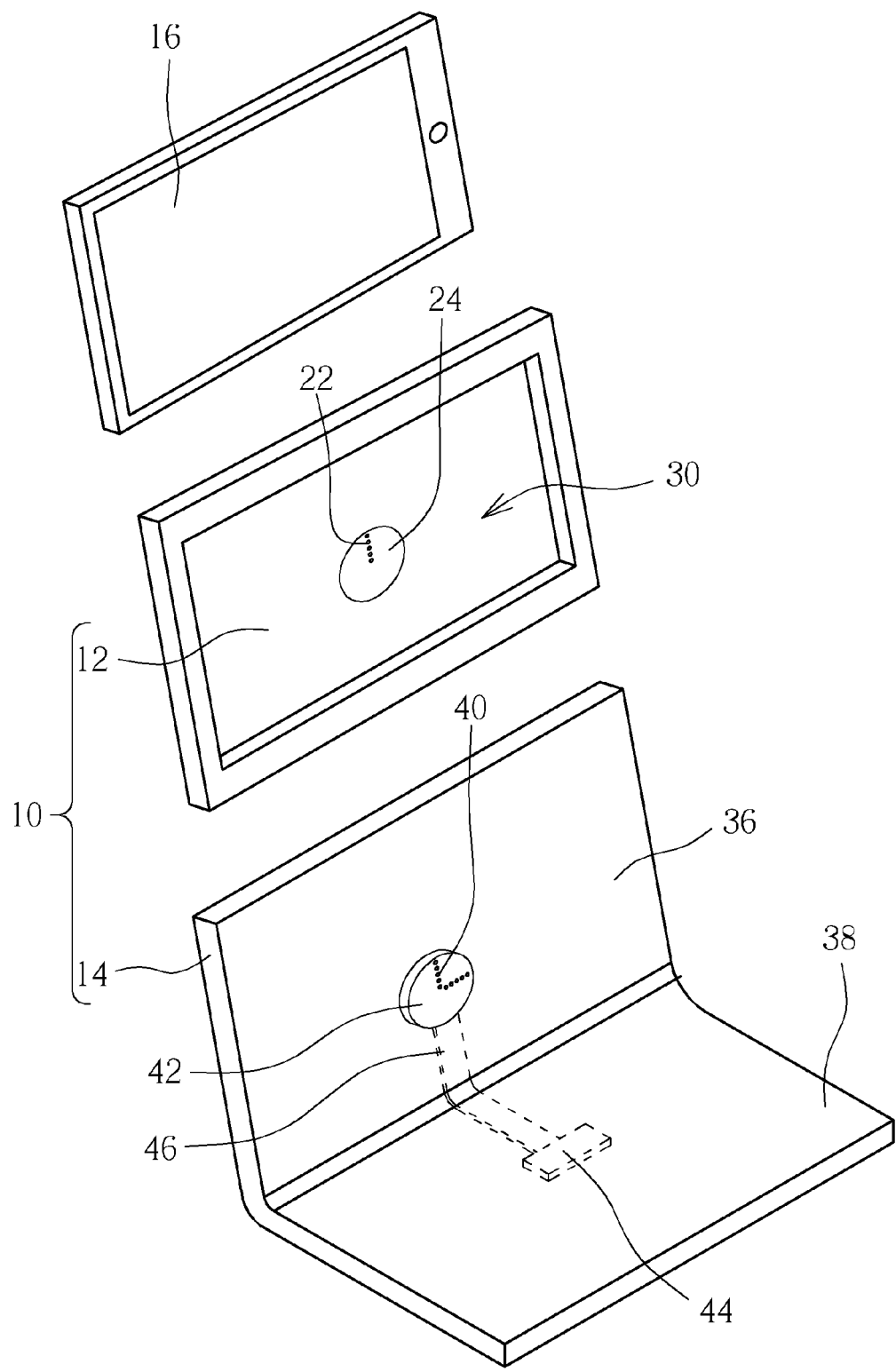
FIG. 1 and FIG. 2 respectively are exploded diagrams of a protection device in different views according to an embodiment of the present invention.
Figure 2:
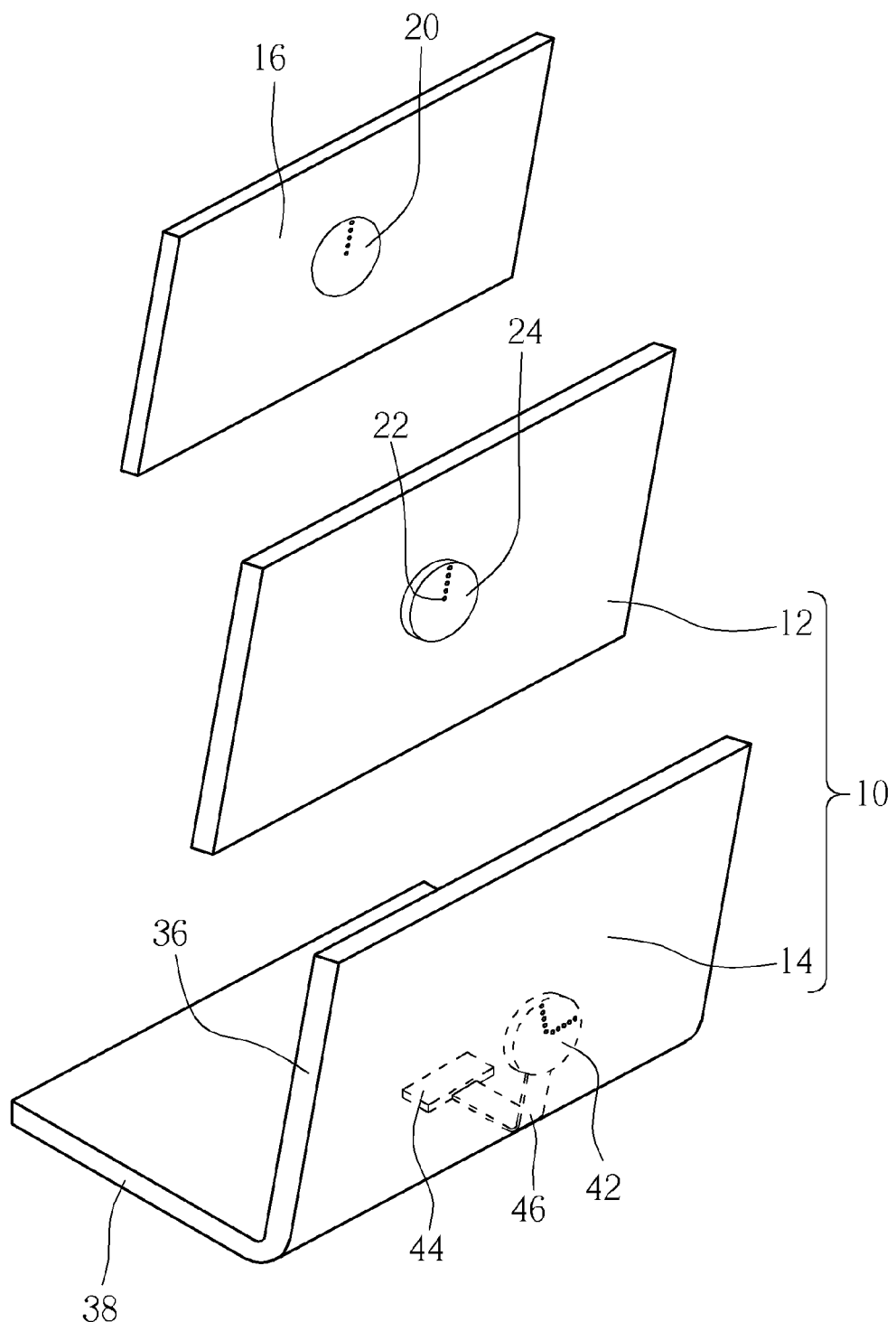
Figure 3:
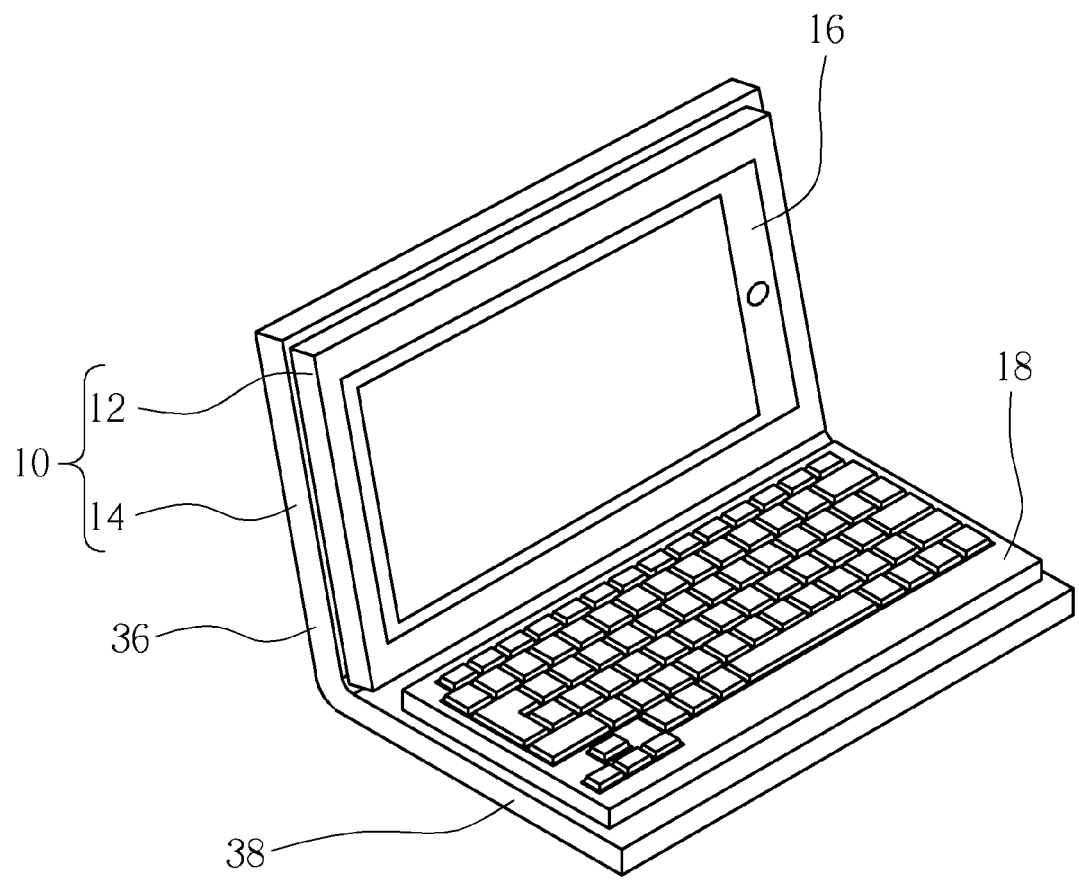
FIG. 3 and FIG. 4 respectively are diagrams of the protection device in different operation moves according to the embodiment of the present invention.
Figure 4:
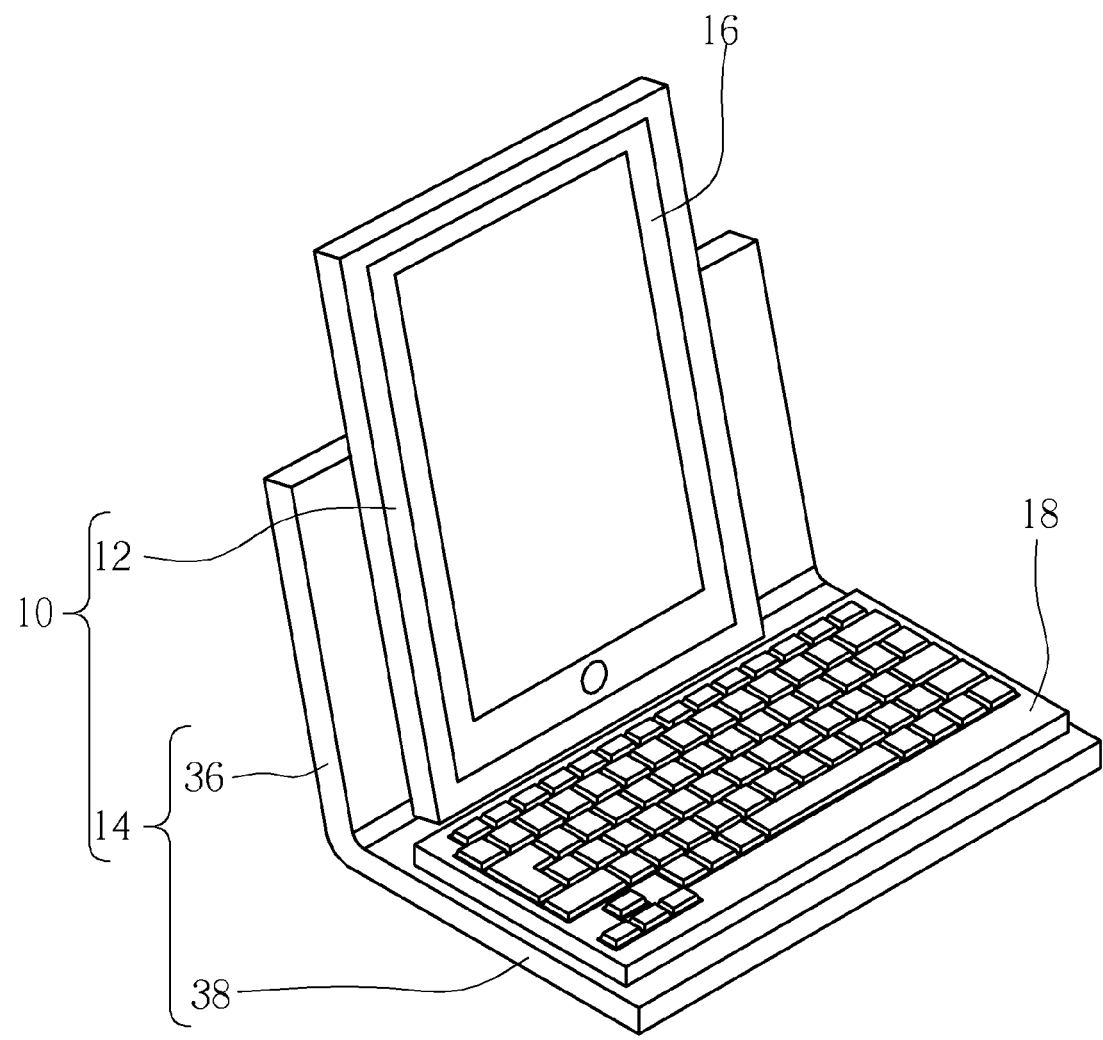

Please refer to FIG. 1 to FIG. 4. FIG. 1 and FIG. 2 respectively are exploded diagrams of a protection device 10 in different views according to an embodiment of the present invention. FIG. 3 and FIG. 4 respectively are diagrams of the protection device 10 in different operation modes according to the embodiment of the present invention. The protection device 10 includes a cladding cover 12 and a folding cover 14. Generally, the cladding cover 12 can be a rigid protective housing, and the folding cover 14 can be a pliable foldable sheath. The cladding cover 12 is utilized to detachably support the portable electronic device 16. The portable electronic device 16 can be any electronic device with the touch panel, such as a tablet computer, a digital photo frame, a smart phone and so on. The cladding cover 12 is rotatably assembled with the folding cover 14, and the cladding cover 12 can be at least switched between a first position and a second position relative to the folding cover 14, so as to set the portable electronic device 16 as an upright mode or a recumbent mode.

The portable electronic device 16 can be rotated relative to the folding cover 14 at a clockwise direction or a counterclockwise direction via the cladding cover 12, and an angle formed between the first position and the second position substantially equals, but not limited to, 90 degrees. As shown in FIG. 3, the cladding cover 12 is switched to the first position, the portable electronic device 16 and the cladding cover 12 are recumbent over the folding cover 14, and a horizontal image is displayed on the portable electronic device 16. As shown in FIG. 4, the cladding cover 12 is switched to the second position, the portable electronic device 16 and the cladding cover 12 are upright over the folding cover 14, and an upright image is displayed on the portable electronic device 16. The portable electronic device 16 may have a built-in orientation sensor, such as the gyroscope or the gravity sensor, which is utilized to detect active variation of the portable electronic device 16 so as to switch orientation of the displaying image accordingly.

In addition, at least one or more external auxiliary device 18 can be selectively disposed on the folding cover 14 in a detachable manner or in an immovable manner. An amount of the external auxiliary device 18 corresponds to an amount of the connector. The external auxiliary device 18 can be an external keyboard, an external speaker, a power supply etc. Information is transmitted between the portable electronic device 16 and the external auxiliary device 18 by a built-in physical transmission cable of the protection device 10 for functions of inputting a control command, playing acoustic source and transmitting charging current.

Figure 5:
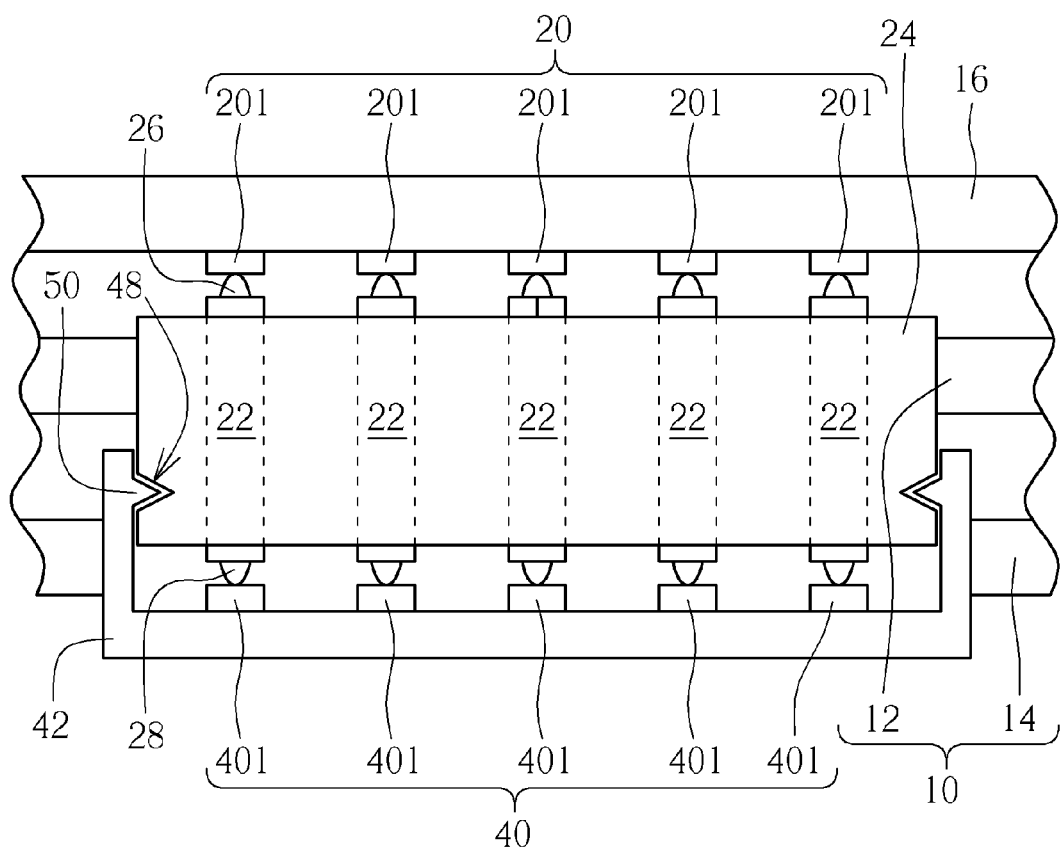
FIG. 5 is a partial sectional view of the protection device and the portable electronic device 16 according to the embodiment of the present invention.
Figure 6:
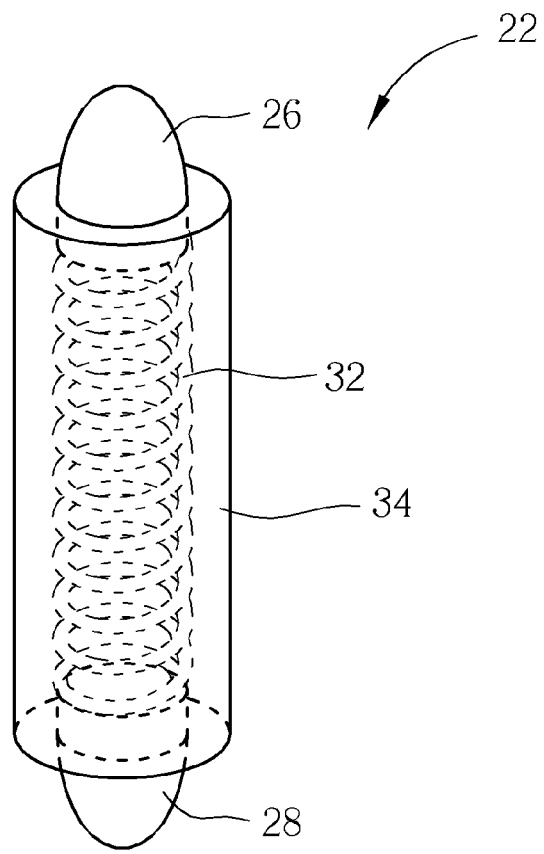
FIG. 6 is a diagram of the first connector of a cladding cover according to the embodiment of the present invention.
Figure 7:
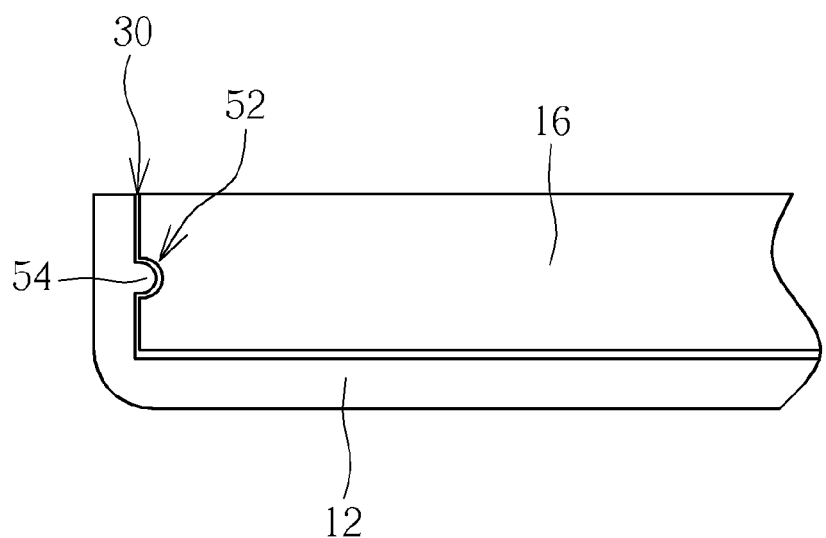
FIG. 7 is a partial sectional view of a portable electronic device and the cladding cover according to the embodiment of the present invention.

Please refer to FIG. 1 to FIG. 7. FIG. 5 is a partial sectional view of the protection device 10 and the portable electronic device 16 according to the embodiment of the present invention. FIG. 6 is a diagram of the first connector of the cladding cover 12 according to the embodiment of the present invention. FIG. 7 is a partial sectional view of the portable electronic device 16 and the cladding cover 12 according to the embodiment of the present invention. The portable electronic device 16 includes a first terminal set 20 disposed on a back (a surface opposite to a displaying surface) of the portable electronic device 16. The cladding cover 12 includes a first connector 22 and a first combining portion 24. The first connector 22 is preferably disposed inside the first combining portion 24. The first connector 22 includes a first joint 26 and a second joint 28 opposite to each other. The cladding cover 12 has an accommodating space 30 for accommodating the portable electronic device 16. The first connector 22 is disposed on a housing of the cladding cover 12, and the first joint 26 protrudes from the accommodating space 30 to be electrically connected with the first terminal set 20 of the portable electronic device 16.

The first connector 22 further includes a resilient component 32 and a tube 34. The resilient component 32 preferably can be a compressive spring and disposed inside the tube 34. The first joint 26 and the second joint 28 are respectively disposed on two ends of the resilient component 32 and movably protrude from end openings on the tube 34. When the portable electronic device 16 is disposed inside the accommodating space 30, the first joint 26 of the first connector 22 is pressed by the first terminal set 20, the resilient component 32 is compressed and the first joint 26 is partly retracted into the tube 34. In the meanwhile, a resilient recovering force of the resilient component 32 pushed the first joint 26 relative to the tube 34 outwardly, to ensure that the first joint 26 stably contacts the first terminal set 20 without instant interruption. Electrical contacting method between the second joint 28 and a related terminal set is the same as ones mentioned above, and a detailed description is omitted herein for simplicity.

The folding cover 14 includes a first body 36, a second body 38, a second terminal set 40, a second combining portion 42 and a second connector 44. The first body 36 is utilized to support the cladding cover 12 and the portable electronic device 16. The second body 38 is foldably connected to the first body 36. The second body 38 can rotatably cover the display surface of the portable electronic device 16 for dustproof protection, or can be unfolded relative to the first body 36 to expose the display surface of the portable electronic device 16. The second combining portion 42 is disposed on the first body 36, and the second terminal set 40 is preferably disposed inside the second combining portion 42. The second connector 44 is electrically connected to the second terminal set 40 and disposed on the second body 38. The folding cover 14 further includes a transmission cable 46. Two ends of the transmission cable 46 are respectively connected to the second connector 44 and the second terminal set 40, which means the transmission cable 46 is a flexible flab cable stretching between the first body 36 and the second body 38. When the external auxiliary device 18 is detachably disposed on the cladding cover 12 and electrically connected to the second connector 44, the portable electronic device 16 is disposed on the cladding cover 12 and rotatably combined with the folding cover 14, the first joint 26 and the second joint 28 of the first connector 22 electrically contacts the first terminal set 20 and the second terminal set 40 respectively, and the second terminal set 40 is electrically connected to the second connector 44 via the transmission cable 46 to establish signal transmission channel between the portable electronic device 16 and the external auxiliary device 18.

In the preferred embodiment of the present invention, the first combining portion 24 includes an annular portion 48, and the second combining portion 42 includes a resilient hook 50. An amount of the hook 50 can be one or more. A plurality of the hooks 50 is arranged in symmetry or in asymmetry. When the first combining portion 24 is combined with the second combining portion 42, the hook 50 is slidably engaged with the annular slot 48, the first combining portion 24 can arbitrarily rotate relative to the second combining portion 42 at the clockwise direction or the counterclockwise direction, so as to switch the cladding cover 12 to the first position or the second position, which means a display angle or a collocating orientation of the portable electronic device 16 can be varied. Assembly structural design of the first combining portion 24 and the second combining portion 42 is not limited to the above-mentioned embodiment, and depends on actual demand. For example, the first combining portion 24 can have the hook, and the second combining portion 42 can have the annular slot. Any assembly design capable of satisfying rotatable requirement belongs to scope of the first combining portion 24 and the second combining portion 42 in the present invention.

As shown in FIG. 7, the portable electronic device further includes a first wedging portion 52, and the cladding cover 12 further includes a second wedging portion 54. The first wedging portion 52 and the second wedging portion 54 respectively can be a sunken slot and a protrusion. The first wedging portion 52 stretches around an edge of the portable electronic device 16, and the second wedging portion 54 is disposed on an inner wall of the accommodating space 30 of the cladding cover 12. When the portable electronic device 16 is put into the accommodating space 30, the second wedging portion 54 can be wedged with the first wedging portion 52 is a structurally deformable manner for easy assembly of the portable electronic device 16 and the cladding cover 12. Edges of cladding cover 12 can be pulled open to separate the second wedging portion 54 from the first wedging portion 52, and the portable electronic device 16 can be conveniently removed from the accommodating space 30 for disassembly of the portable electronic device 16 and the cladding cover 12. Design of the first wedging portion 52 and the second wedging portion 54 is not limited to the above-mentioned embodiment. For example, the second wedging portion 54 may be formed around the cladding cover 12 and protrude inward the accommodating space 30, so the edge of the portable electronic device 16 can be pressed or clamped by the second wedging portion 54 for combination. Any structure capable of detachably installing the portable electronic device 16 on the cladding cover 12 belongs to scope of the wedging portions in the present invention.

Figure 8:
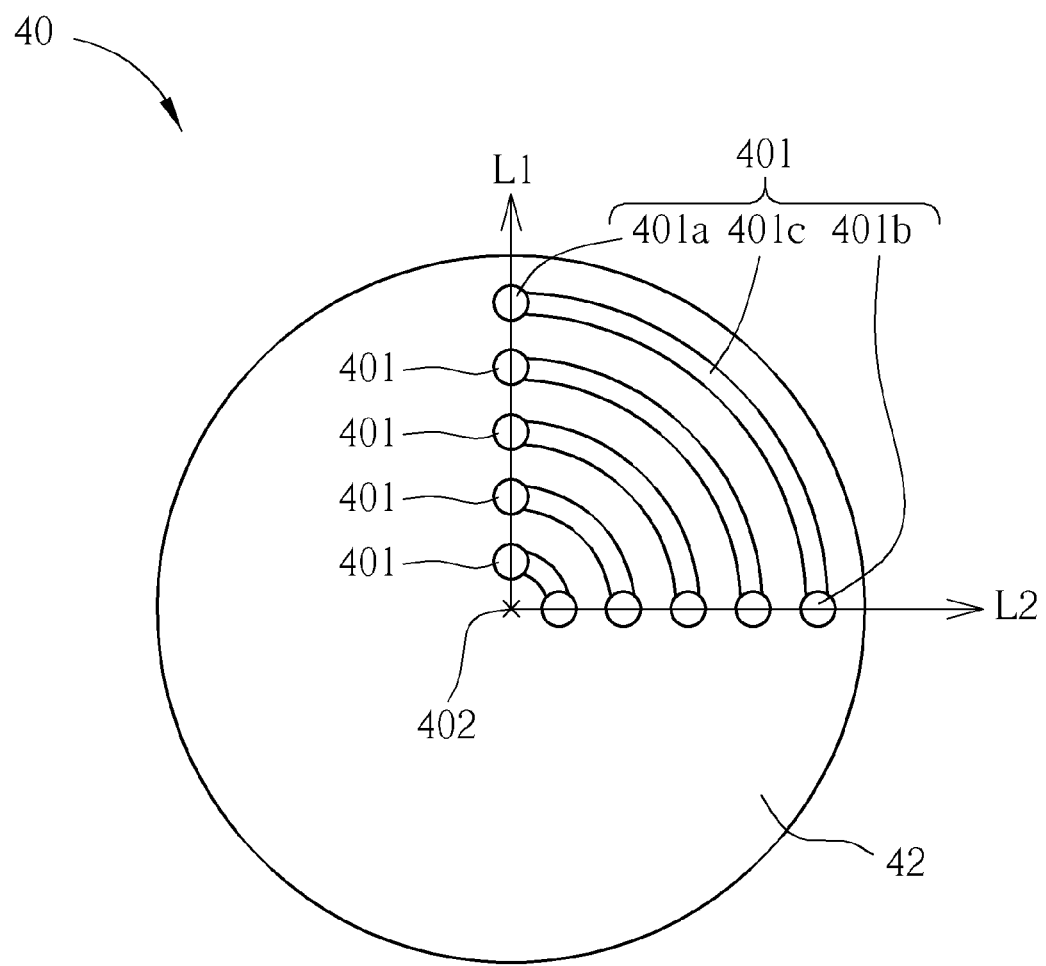
FIG. 8 is a diagram of a second terminal set and a second combining portion according to the embodiment of the present invention.
Figure 9:
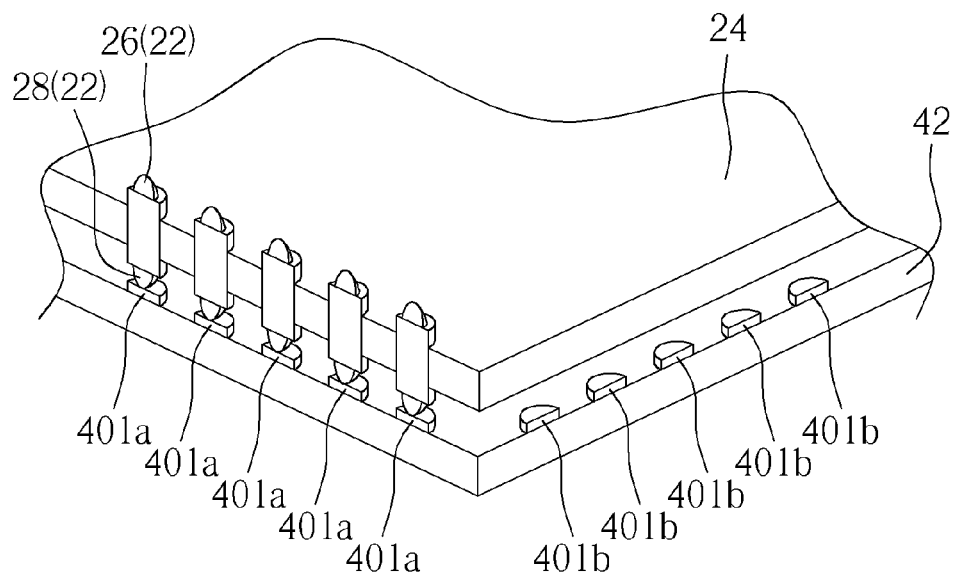
FIG. 9 and FIG. 10 respectively are partial sectional views of a first combining portion and the second combining portion in different positions according to the embodiment of the present invention.
Figure 10:
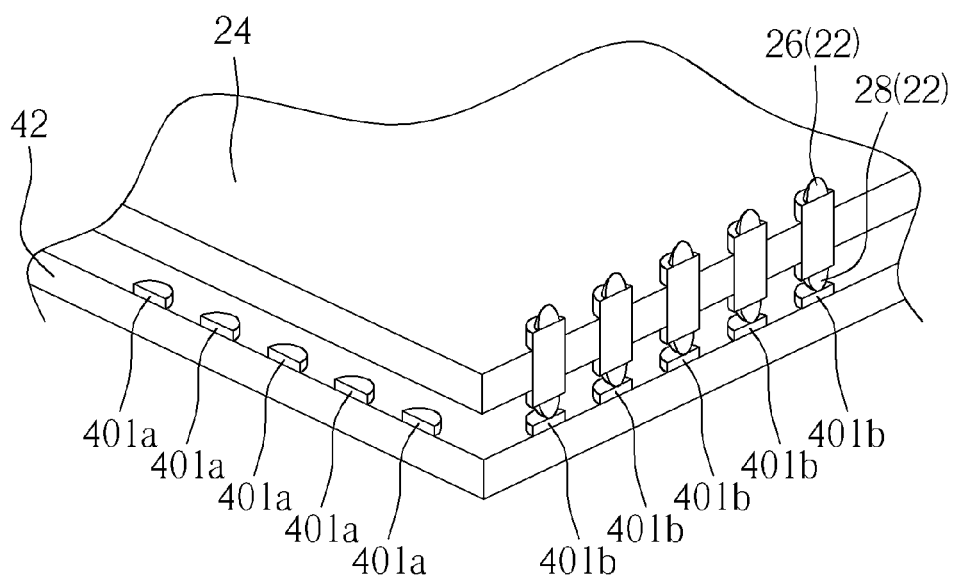

Please refer to FIG. 5 and FIG. 8 to FIG. 10. FIG. 8 is a diagram of the second terminal set 40 and the second combining portion 42 according to the embodiment of the present invention. FIG. 9 and FIG. 10 respectively are partial sectional views of the first combining portion 24 and the second combining portion 42 in different positions according to the embodiment of the present invention. In this embodiment, the second terminal set 40 includes five second terminals 401; accordingly, the cladding cover 12 includes five first connectors 22, and the first terminal set 20 includes five first terminals 201. One of the five terminals 201, 401 is a ground terminal, another one of the five terminals 201, 401 is a power terminal, and the other three of the five terminals 201, 401 are signal terminals. Amounts and functions of the terminal are not limited to the above-mentioned embodiment.

Each second terminal 401 includes a first point 401a, a second point 401b and a connection section 401c. Two ends of the connecting section 401c are respectively connected to the first point 401a and the second point 401b. The second point 401b is an arc structure, so that a first connection direction L1 between the first point 401a and the rotary center 402 is different from a second connecting direction L2 between the second point 401b and the rotary center 402. An arc length of the second terminal 401 is designed according to a rotary angle formed between the cladding cover 12 and the folding cover 14. For example, an angle formed between the first position and the second position equals 90 degrees, the first connecting direction L1 is substantially perpendicular to the second connecting direction L2, and the arc length of the second terminal 401 equals a quarter of periphery. The periphery is calculated by a radius between the first point 401a (or the second point 401b) and the rotary center 402. As shown in FIG. 3 and FIG. 9, the cladding cover 12 is switched to the first position, and the second joint 28 of the first connector 22 contacts the first point 401a. As shown in FIG. 4 and FIG. 10, the cladding cover 12 is switched to the second position, and the second joint 28 contacts the second point 401b. Each first connector 22 can move from the first point 401a to the corresponding second point 401b of the second terminal 401 since the first combining portion 24 rotates relative to the second combining portion 42.

The second terminal 401 further can includes more than two points and a plurality of connecting sections, such as including three points and two connecting sections with the quarter of periphery, and the cladding cover 12 can rotate relative to the folding cover 14 and switchably located at three positions of 0 degree, 90 degrees and 180 degrees. An amount of the point, an amount and a length of the connecting section, angles between each point and the rotary center and an angle between the adjacent point and the rotary center can be adjusted according to actual demand.

Figure 11:
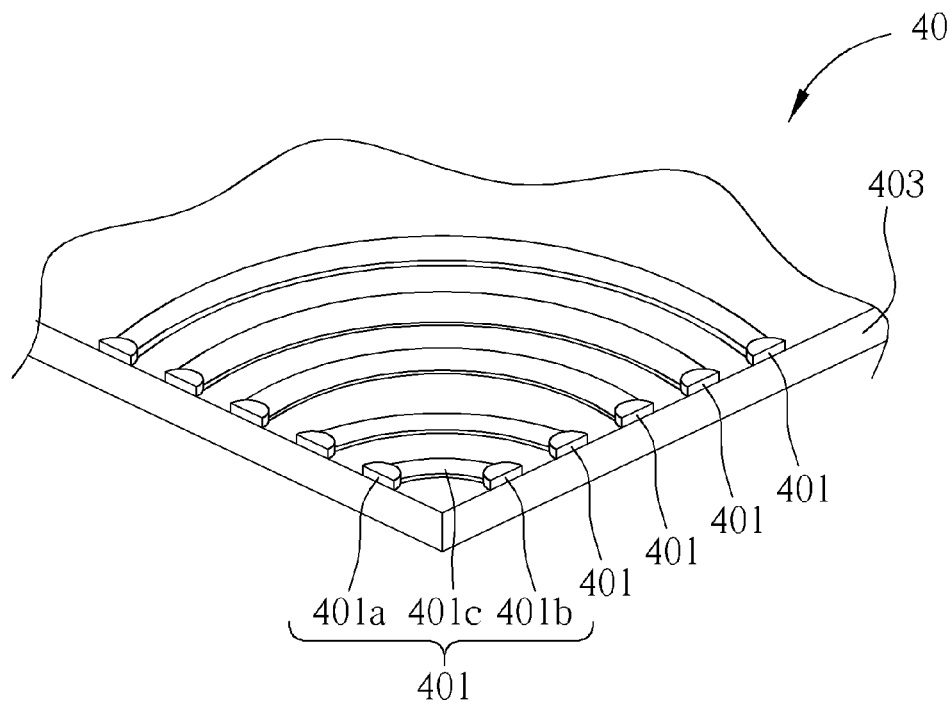
FIG. 11 and FIG. 12 respectively are diagrams of the second terminal set according to different embodiments of the present invention.
Figure 12:
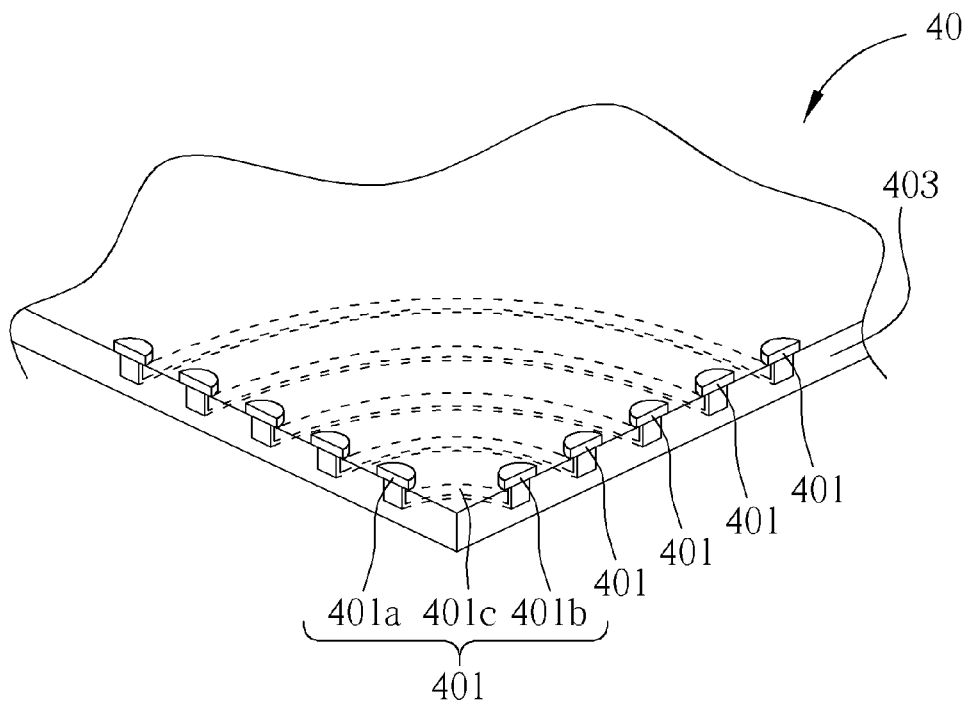

Please refer to FIG. 11 and FIG. 12. FIG. 11 and FIG. 12 respectively are diagrams of the second terminal set 40 according to different embodiments of the present invention. The second terminal set 40 further includes an isolating layer 403 whereon the second terminal 401 is disposed. The first point 401a and the second point 401b partly protrude from the isolating layer 403 to electrically connect the first connector 22. The first point 401a and/or the second point 401b stretch inside the isolating layer 403 to connect with the transmission cable 46 or the corresponding circuit board. The connecting section 401c may protrude from the isolating layer 403 selectively, as shown in FIG. 11, which means the connecting section 401c emerges out of an upper surface of the isolating layer 403. The first connector 22 electrically contacts the connecting section 401c all the time since moving from the first point 401a to the second point 401b, so that electrical connection between the portable electronic device 16 and the external auxiliary device 18 is stably maintained within rotation of the portable electronic device 16. The connecting section 401c further can be embedded in the isolating layer 403, as shown in FIG. 12. When the portable electronic device 16 is switched from the first position to the second position, the first connector 22 moves from the first point 401a to the second point 401 through the isolating layer 403, the electrical connection between the portable electronic device 16 and the external auxiliary device 18 is interrupted since the portable electronic device 16 is not located at the first position or the second position.

Figure 13:
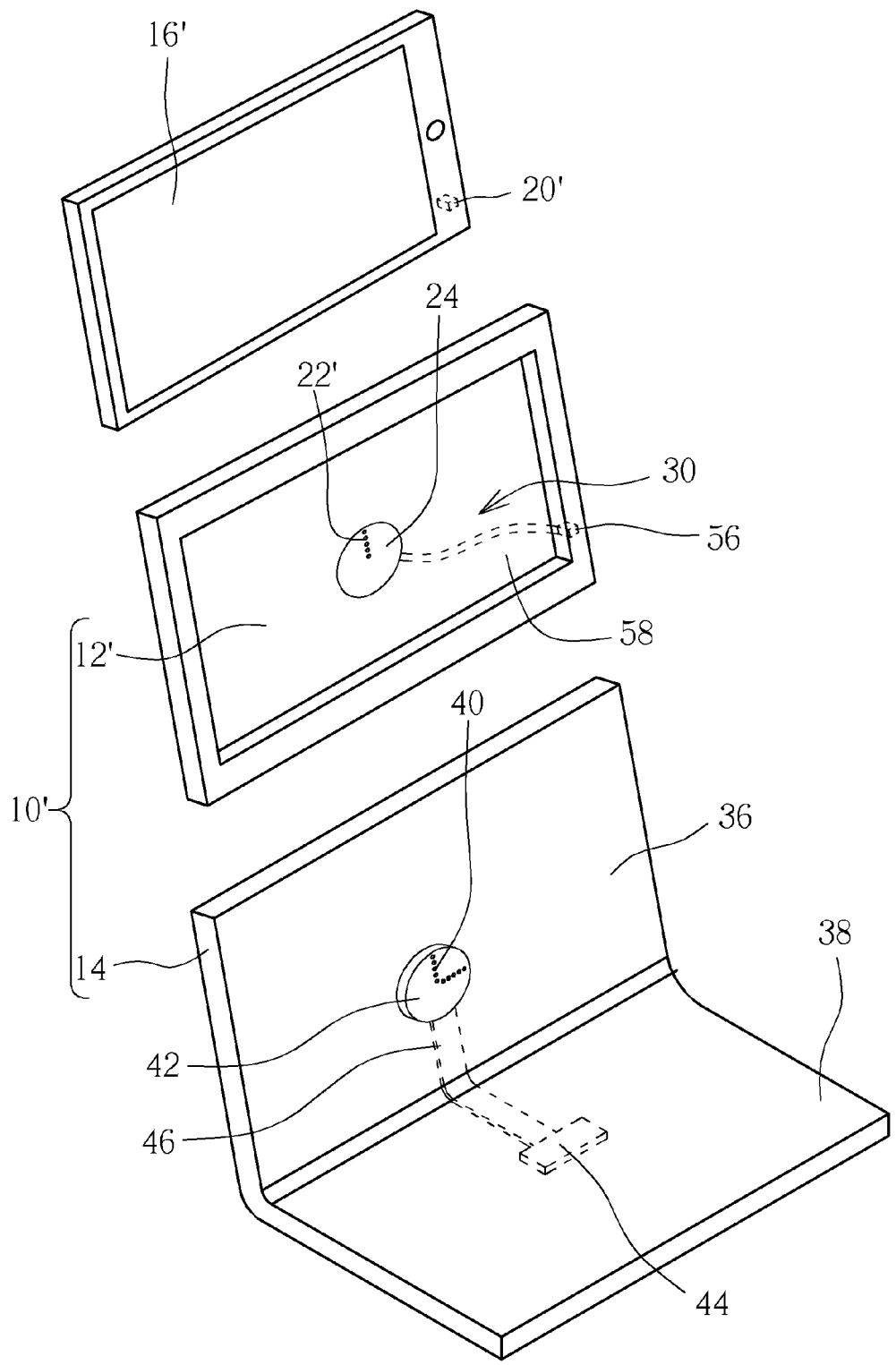
FIG. 13 is an exploded diagram of the protection device according to another embodiment of the present invention.

Please refer to FIG. 13. FIG. 13 is an exploded diagram of the protection device 10' according to another embodiment of the present invention. In this embodiment, elements having the same numeral as ones of the above-mentioned embodiment have the same structures and functions, and a detailed description is omitted for simplicity. Difference between the embodiments is that the first terminal set 20' can be disposed on an edge of the portable electronic device 16', and the cladding cover 12' further includes a third connector 56 and a connecting cable 58. The connecting cable 58 can be the flexible flat cable or any type of the cable, which is embedded in the housing of the cladding cover 12'. The third connector 56 is electrically connected to the first connector 22 via the connecting cable 58, and is adapted to contact the first terminal set 20' to establish the signal transmission channel when the cladding cover 12' supports the portable electronic device 16'. Thus, the first connector 22' only has the second joint (not shown in FIG. 13) to electrically contact the second terminal set 40 since the folding cover 14 is assembled with the cladding cover 12'.

The protection device of the present invention includes the cladding cover and the folding cover which are rotatably assembled with each other. The portable electronic device is detachably disposed on the cladding cover, and the first joint of the first connector of the cladding cover is pressed by the first terminal set of the portable electronic device. The second joint of the first connector can move between the first point and the second point of the second terminal set of the folding cover when the cladding cover rotates relative to the folding cover. The first connector keeps the electrical connection between the first terminal set and the second terminal set no matter what position the cladding cover is switched, so the external auxiliary device disposed on the folding cover can be utilized to input an electronic signal and then the electronic signal can be transmitted to the portable electronic device for program actuation.

The cladding cover can arbitrarily rotate relative to the folding cover at the clockwise direction or the counterclockwise direction. Generally, the cladding cover whereon the portable electronic device is disposed can rotate relative to the folding cover to switch between the first position (0 degree) and the second position (90 degrees). As amounts of the second terminal and the connecting sections are increased, the portable electronic device further can rotate relative to the folding cover to be switchably located at positions in addition to the first position and the second position. The first connector of the present invention can be the single-head connector (only has the second joint) or the dual-head connector (has the first joint and the second joint), position of the first terminal set of the portable electronic device is varied according to the joint amount of the first connector. Comparing to the prior art, the present invention provides new design for rotatable combination between the cladding cover and the folding cover, the portable electronic device can stably stand over the folding cover at any display angle and the signal transmission channel between the portable electronic device and the external auxiliary device is effectively maintained.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A protection device capable of rotatably supporting a portable electronic device, the portable electronic device having a first terminal set, the protection device comprising: a cladding cover whereon the portable electronic device is detachably disposed, the cladding cover comprises: a first combining portion; and a first connector disposed inside the first combining portion, the first connector comprising a first joint and a second joint opposite to each other, the first joint being adapted to contact the first terminal set when the cladding cover supports the portable electronic device; and a folding cover, comprising: a first body; a second body foldably connected to the first body; a second combining portion disposed on the first body, the second combining portion being adapted to rotatably combine with the first combining portion so that the cladding cover is at least switched between a first position and a second position relative to the folding cover; a second terminal set disposed inside the second combining portion and being adapted to contact the second joint when the folding cover is slidably engaged with the cladding cover by a user; and a second connector disposed on the second body and electrically connected to the second terminal set.

2. The protection device of claim 1, wherein the second terminal set comprises at least one terminal, the at least one terminal comprises a first point, a second point and a connecting section, two ends of the connecting section are respectively connected to the first point and the second point, the second joint contacts the first point since the cladding cover is switched to the first position, and further contacts the second point since the cladding cover is switched to the second position.

3. The protection device of claim 2, wherein the second terminal set further comprises an isolating layer wherefrom the first point and the second point protrude, the connecting section protrudes from or is embedded in the isolating layer.

4. The protection device of claim 2, wherein the second terminal set further comprises a rotary center, a first connecting direction between the first point and the rotary center is different from a second connecting direction between the second point and the rotary center.

5. The protection device of claim 4, wherein the first connecting direction is substantially perpendicular to the second connecting direction.

6. The protection device of claim 1, wherein the folding cover further comprises a transmission cable stretched between the first body and the second body, two ends of the transmission cable are respectively connected to the second connector and the second terminal set.

7. The protection device of claim 1, wherein the first combining portion and the second combining portion respectively comprises an annular slot and a hook, the hook is slidably engaged inside the annular slot.

8. The protection device of claim 1, wherein the first connector further comprises a resilient component and a tube, the resilient component is disposed inside the tube, the first joint and the second joint are respectively disposed on two ends of the resilient component and partly protrude from the tube.

9. The protection device of claim 1, wherein the portable electronic device further comprises a first wedging portion, the cladding cover further comprises a second wedging portion wedged with the first wedging portion in a structurally deformable manner.

10. The protection device of claim 9, wherein the first wedging portion and the second wedging portion respectively are a sunken slot and a protrusion.

11. A protection device capable of rotatably supporting a portable electronic device, the portable electronic device having a first terminal set, the protection device comprising: a cladding cover whereon the portable electronic device is detachably disposed, the cladding cover comprises: a first combining portion; and a first connector disposed inside the first combining portion, the first connector comprising a second joint; a third connector electrically connected to the first connector and being adapted to contact the first terminal set when the cladding cover supports the portable electronic device; and a folding cover, comprising: a first body; a second body foldably connected to the first body; a second combining portion disposed on the first body, the second combining portion being adapted to rotatably combine with the first combining portion so that the cladding cover is at least switched between a first position and a second position relative to the folding cover; a second terminal set disposed inside the second combining portion and being adapted to contact the second joint when the folding cover is slidably engaged with the cladding cover by a user; and a second connector disposed on the second body and electrically connected to the second terminal set.

12. The protection device of claim 11, wherein the second terminal set comprises at least one terminal, the at least one terminal comprises a first point, a second point and a connecting section, two ends of the connecting section are respectively connected to the first point and the second point, the second joint contacts the first point since the cladding cover is switched to the first position, and further contacts the second point since the cladding cover is switched to the second position.

13. The protection device of claim 12, wherein the second terminal set further comprises an isolating layer wherefrom the first point and the second point protrude, the connecting section protrudes from or is embedded in the isolating layer.

14. The protection device of claim 12, wherein the second terminal set further comprises a rotary center, a first connecting direction between the first point and the rotary center is different from a second connecting direction between the second point and the rotary center.

15. The protection device of claim 14, wherein the first connecting direction is substantially perpendicular to the second connecting direction.

16. The protection device of claim 11, wherein the folding cover further comprises a transmission cable stretched between the first body and the second body, two ends of the transmission cable are respectively connected to the second connector and the second terminal set.

17. The protection device of claim 11, wherein the first connector further comprises a resilient component and a tube, the resilient component is disposed inside the tube, the second joint is disposed on an end of the resilient component and partly protrudes from the tube.

* * * * *